(12) United States Patent
Lu (10) Patent No.: US 11,728,521 B2
(45) Date of Patent: Aug. 15, 2023

(54) DENDRITE-FREE LITHIUM METAL BATTERY BY DEFORMATION-INDUCED POTENTIAL SHIELDING

(71) Applicant: The Regents of The University of Michigan, Ann Arbor, MI (US)

(72) Inventor: Wei Lu, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 214 days.

(21) Appl. No.: 16/199,441

(22) Filed: Nov. 26, 2018

(65) Prior Publication Data
US 2019/0165429 A1 May 30, 2019

Related U.S. Application Data

(60) Provisional application No. 62/590,905, filed on Nov. 27, 2017.

(51) Int. Cl.
*H01M 10/42* (2006.01)
*H01M 10/0525* (2010.01)
(Continued)

(52) U.S. Cl.
CPC ....... *H01M 10/4235* (2013.01); *H01M 4/134* (2013.01); *H01M 4/381* (2013.01);
(Continued)

(58) Field of Classification Search
None
See application file for complete search history.

(56) References Cited

U.S. PATENT DOCUMENTS

| 5,378,551 A * | 1/1995 | Meadows | H01M 10/4214 |
| | | | 429/66 |
| 2007/0054188 A1* | 3/2007 | Miller | H01M 4/581 |
| | | | 429/218.1 |

(Continued)

FOREIGN PATENT DOCUMENTS

WO 2017184482 A1 10/2017

OTHER PUBLICATIONS

Correia et al. (2015). "Influence of oxygen plasma treatment parameters on poly(vinylidene fluoride) electrospun fiber mats wettability." Progress in Organic Coatings, 85 151-158.

(Continued)

*Primary Examiner* — Carmen V Lyles-Irving
(74) *Attorney, Agent, or Firm* — Quarles & Brady LLP (57) ABSTRACT

Disclosed are a system and methods for preventing dendrite growth in an electrochemical cell through the use of a protective layer. The electrochemical cell may comprise an anode, a cathode, an electrolyte, and a protective layer, wherein the protective layer is capable of producing a voltage. The voltage produced can selectively shield metal ions from certain regions of the protective layer. This shielding can result in a more uniform flux of metal ions being transferred across the electrode-electrolyte interface in subsequent electrodeposition and electrodissolution processes. As a result, an electrode with such a protective layer can exhibit improved performance and durability, including markedly lower overpotentials and largely improved metal (e.g., lithium) retention.

29 Claims, 8 Drawing Sheets

(51) Int. Cl.
*H01M 10/0585* (2010.01)
*H01M 4/62* (2006.01)
*H01M 10/0562* (2010.01)
*H01M 4/134* (2010.01)
*H01M 10/058* (2010.01)
*H01M 10/052* (2010.01)
*H01M 4/38* (2006.01)
*H01M 4/485* (2010.01)
*H01M 4/02* (2006.01)
*H01M 4/587* (2010.01)
*H01M 50/434* (2021.01)
*H01M 50/426* (2021.01)
*H01M 50/431* (2021.01)

(52) U.S. Cl.
CPC ............. *H01M 4/382* (2013.01); *H01M 4/62* (2013.01); *H01M 10/052* (2013.01); *H01M 10/058* (2013.01); *H01M 10/0525* (2013.01); *H01M 10/0562* (2013.01); *H01M 10/0585* (2013.01); *H01M 4/38* (2013.01); *H01M 4/386* (2013.01); *H01M 4/485* (2013.01); *H01M 4/587* (2013.01); *H01M 50/426* (2021.01); *H01M 50/431* (2021.01); *H01M 50/434* (2021.01); *H01M 2004/021* (2013.01); *H01M 2010/4271* (2013.01); *H01M 2300/0068* (2013.01); *H01M 2300/0071* (2013.01)

(56) References Cited

U.S. PATENT DOCUMENTS

2014/0342192 A1* 11/2014 Wang .................... H01G 11/06
429/7
2015/0171398 A1* 6/2015 Roumi .............. H01M 10/4257
429/7
2016/0013462 A1 1/2016 Cui et al.
2018/0248189 A1* 8/2018 Pan ........................ H01M 4/366
2018/0301707 A1* 10/2018 Pan ..................... H01M 4/1395
2019/0173126 A1* 6/2019 Jeon .................. H01M 10/4235

OTHER PUBLICATIONS

Dargaville et al. "Characterization, Performance and Optimization of PVDF as a Piezoelectric Film for Advanced Space Mirror Concepts" Sandia National Laboratories, Sandia Report, SAND2005-6846, Unlimited Release, Printed Nov. 2005, pp. 1-49.

Kim et al. "Characterization and applications of piezoelectric polymers" Electrical Engineering and Computer Sciences University of California at Berkeley, Technical Report No. UCB/EECS-2015-253 http://www.eecs.berkeley.edu/Pubs/TechRpts/2015/EECS-2015-253.html, Dec. 18, 2015, 29 pages.

MCDowall (2008) "Understanding Lithium-Ion Technology" (2008), pp. 9-1-9-10.

Ramadan et al. "A review of piezoelectric polymers as functional materials for electromechanical transducers" IOP Publishing Ltd, Smart Materials and Structures, 23 (2014) 033001 (pp. 1-26).

Seh et al. "A Highly Reversible Room-Temperature Sodium Metal Anode" ACS Publications, 2015 American Chemical Society, ACS Cent. Sci. 2015, 1, 449-455, DOI: 10.1021/acscentsci.5b00328.

Xu et al. "Lithium metal anodes for rechargeable batteries" The Royal Society of Chemistry, Energy Environ. Sci., 2014, 7, 513-537.

Zimmerman et al. (2010) "Lithium Plating in Lithium-Ion Cells" The Aerospace Corporation 2010, Presented at the NASA Battery Workshop, Nov. 16-18, 2010, Huntsville, AL, 19 pages.

* cited by examiner

DENDRITE-FREE LITHIUM METAL BATTERY BY DEFORMATION-INDUCED POTENTIAL SHIELDING

CROSS-REFERENCES TO RELATED APPLICATIONS

This application claims priority to U.S. Patent Application No. 62/590,905 filed Nov. 27, 2017.

STATEMENT REGARDING FEDERALLY SPONSORED RESEARCH

Not Applicable.

BACKGROUND OF THE INVENTION

1. Field of the Invention

This invention relates to electrochemical devices, such as electrochemical cells containing a metal anode. This invention also relates to methods for preventing dendrite growth in electrochemical cells. In one aspect, a protective layer is used to prevent dendrite growth.

2. Description of the Related Art

Lithium ion (Li-ion) battery technology has advanced significantly and has a market size projected to be $10.5 billion by 2019. Current state-of-the-art Li-ion batteries comprise two electrodes (an anode and a cathode), a separator material that keeps the electrodes from touching but allows $Li^+$ ions through, and an electrolyte (which is often an organic liquid with lithium salts). During charge and discharge, $Li^+$ ions are exchanged between the electrodes.

Batteries with longer lives, higher capacities, and reduced safety concerns are needed for many applications including electric vehicles, grid storage, and consumer electronics. For many years, lithium (Li) metal has been considered the "ideal" anode material because of its ability to store lightweight lithium in the metallic form without the need for an inactive host material or a conductive scaffold. Lithium can provide a capacity of 3860 mAh/g and the lowest theoretical anode potential, making it an enabling technology for next-generation battery systems including Li-sulfur and Li-air. Unfortunately, reactivity issues resulting from electrode-electrolyte interactions prevent extended cycling of lithium metal. These interactions lead to the formation of erratic dendritic structures that cause a reduction in Coulombic efficiency and eventual failure. These types of failure not only may shorten battery life but may also cause safety hazards as a result of gas evolution and possible ignition of the flammable electrolyte.

A natural solid electrolyte interphase (SEI) is known to form as a result of lithium metal interacting with the electrolyte. This layer acts as an ionic conductor and electronic insulator and evolves to form a complex, multilayer surface coating. However, as metallic lithium is plated or stripped, uneven current distributions resulting from surface inhomogeneities lead to localized "hot spots" where lithium preferentially nucleates, resulting in the fracture of the SEI layer due to localized stresses. This exposes the underlying lithium metal leading to dendrite growth and further deleterious and potentially dangerous side reactions. The effect of these reactions is threefold: (1) dendrite growth may lead to short-circuiting, (2) rapid consumption of the electrolyte may cause high overpotentials and thick SEI layers that consume previously active lithium and may lead to cell failure due to insufficient electrolyte, and (3) inactive or "dead" lithium which forms as dendrites may become electrically isolated from the bulk electrode, leading to capacity fade of the cell over time. Unfortunately, dendrite growth is a positive feedback phenomenon such that, as cycling proceeds, deposition will preferentially occur on existing dendrites, thus exacerbating the problem.

For decades, researchers have tried to use anode coatings or solid state electrolytes to mechanically "block" dendrite growth. However, these attempts have yielded poor results. Even with strong ceramic electrolytes, dendrites have still formed. Dendrites can also be generated beneath a physical barrier if the coating or barrier is not bonded well. Recent analysis has shown that the material toughness required to mechanically "block" dendrite penetration may not be feasible.

Therefore, there is need for an improved system and/or method that prevents dendrite growth from the lithium metal electrode into the electrolyte. Such a method and/or system would result in enhanced cell life cycle, efficiency, and safety; ushering in a new era where lithium metal batteries overtake traditional lithium ion batteries in commercial usage.

SUMMARY OF THE INVENTION

This disclosure provides a system and methods for preventing dendrite growth in an electrochemical cell by including a protective layer, the protective layer capable of producing a voltage. The voltage may be localized to specific areas of the protective layer, and the voltage may be initiated by a dendrite contacting the protective layer. The voltage may deter ions from the specific area. This may lead to a more uniform flux of ions being transferred across the electrode-electrolyte interface in subsequent electrodeposition and electrodissolution processes. As a result, an electrochemical cell containing such a protective layer may exhibit improved performance and durability.

This disclosure can be applied in a formation process for batteries that use metal (e.g., lithium, magnesium, sodium, zinc) electrodes. The disclosure can be applied to both lithium metal batteries and lithium ion batteries, as well as any other electrochemical cell that contains electrodes capable of generating dendrites. The addition of the protective layer of the present disclosure to an electrochemical cell may advantageously improve cell lifetime and efficiency for an electrochemical cell in which the protective layer is included.

In an aspect, the present disclosure provides an electrochemical cell. The cell comprises an anode, a cathode, an electrolyte, and a protective layer. A portion of the electrolyte is located between the anode and cathode. The protective layer is capable of producing a voltage and at least a portion of the protective layer is located between the anode and cathode.

In another aspect, the present disclosure provides a method of reducing dendrite growth in metal electrochemical cells. The method comprises arranging a protective layer between the anode and the cathode, generating a voltage in an area of the protective layer, and shielding metal ions from depositing in the area.

In yet another aspect, the present disclosure provides a battery comprising one or more interconnected electrochemical cells as described herein, wherein the electrochemical cells are connected in a series, in parallel, or a combination thereof. The electrochemical cells described herein may be used for a variety of batteries and other electrochemical energy storage devices. For example, the electrochemical cells may be used in lithium metal anode batteries, such as lithium-sulfur batteries and lithium-air batteries, among others.

In yet another aspect, the present disclosure provides a method of detecting dendrite growth in an electrochemical cell. The method comprises (a) arranging a protective layer between an anode and a cathode of the electrochemical cell; and (b) detecting a voltage generated in an area of the protective layer by growth of a dendrite on at least one of the anode and the cathode. The voltage generated in the protective layer may be produced by at least one of the piezoelectric effect, charge shifting, charge asymmetry, or local charge flow.

Additionally, the system and method involving the protective layer may be utilized on a variety of battery chemistries and even optimized for each specific electrode and electrolyte combination.

These and other features, aspects, and advantages of the present disclosure will become better understood upon consideration of the following detailed description, drawings, and appended claims.

DETAILED DESCRIPTION OF THE INVENTION

Before the present invention is described in further detail, it is to be understood that the invention is not limited to the particular embodiments described. It is also to be understood that the terminology used herein is for the purpose of describing particular embodiments only, and is not intended to be limiting. The scope of the present invention will be limited only by the claims. As used herein, the singular forms "a", "an", and "the" include plural embodiments unless the context clearly dictates otherwise.

It should be apparent to those skilled in the art that many additional modifications beside those already described are possible without departing from the inventive concepts. In interpreting this disclosure, all terms should be interpreted in the broadest possible manner consistent with the context. Variations of the term "comprising", "including", or "having" should be interpreted as referring to elements, components, or steps in a non-exclusive manner, so the referenced elements, components, or steps may be combined with other elements, components, or steps that are not expressly referenced. Embodiments referenced as "comprising", "including", or "having" certain elements are also contemplated as "consisting essentially of" and "consisting of" those elements, unless the context clearly dictates otherwise. It should be appreciated that aspects of the disclosure that are described with respect to a system are applicable to the methods, and vice versa, unless the context explicitly dictates otherwise.

Numeric ranges disclosed herein are inclusive of their endpoints. For example, a numeric range of between 1 and 10 includes the values 1 and 10. When a series of numeric ranges are disclosed for a given value, the present disclosure expressly contemplates ranges including all combinations of the upper and lower bounds of those ranges. For example, a numeric range of between 1 and 10 or between 2 and 9 is intended to include the numeric ranges of between 1 and 9 and between 2 and 10.

As used herein, a "cell" or "electrochemical cell" is a basic electrochemical unit that contains the electrodes and an electrolyte. A "battery" or "battery pack" is one or more cells or cell assemblies which are ready for use, as it often contains an appropriate housing, electrical interconnections, and possibly electronics to control and protect the cells from failure.

As used herein, "electrochemical cells" are contemplated as being rechargeable cells, also referred to as secondary cells, unless the context clearly dictates otherwise. The "anode" is defined as the electrode that undergoes oxidation, therefore losing electrons, during discharge. The "cathode" is defined as the electrode that undergoes reduction, therefore gaining electrons, during discharge. These electrochemical roles are reversed during the charging process, but the "anode" and "cathode" electrode designations remain the same.

As used herein, "piezoelectric" materials are defined as materials capable of generating an electric charge that accumulates in response to applied mechanical stress.

In an aspect, the present disclosure provides an electrochemical cell. The cell comprises an anode, a cathode, an electrolyte, and a protective layer. A portion of the electrolyte is located between the anode and cathode. The protective layer is capable of producing a voltage and at least a portion of the protective layer is located between the anode and cathode.

The voltage produced by the protective layer of the electrochemical cell may be produced by at least one of a piezoelectric effect, charge shifting, charge asymmetry, or local charge flow. The voltage may be produced by the piezoelectric effect. The voltage may be the electric potential energy difference between one specific location on the protective layer and another specific location on the protective layer. The voltage may also be the electric potential energy difference between the specific location on the protective layer and some other reference point, such as the anode. The voltage may be positive or negative with respect to the reference point. The protective layer may comprise a piezoelectric material. The protective layer may comprise at least one of a ceramic piezoelectric film or a polymeric piezoelectric film. The protective layer may comprise a piezoelectric material selected from a group consisting of quartz, aluminum phosphate, aluminum nitride, sucrose, potassium sodium tartrate, topaz, lead titanate, tourmaline, langasite, gallium orthophosphate, lithium niobate, lithium tantalate, barium titanate, lead zirconate titanate, potassium niobate, lead indium niobate, lead magnesium niobate, sodium tungstate, zinc oxide, sodium potassium niobate, bismuth ferrite, sodium niobate, barium titanate, sodium bismuth titanate, polyvinylidene fluoride, polyam ides, liquid-crystalline polymers, polyureas, polyacrylonitrile, polyvinylidene chloride, polyvinyl acetate, polyphenyletherni-trile, nylons, poly(1-bicyclobutanecarbonitrile), poly (vinylidene cyanide-vinylacetate), poly(vinylidene fluoride-trifluoroethylene), poly(vinylidene fluoride-tetrafluoroethylene), copolymers of these materials, or composites of these materials. For example, the protective layer may comprise polyvinylidene fluoride or a copolymer thereof. The polyvinylidene fluoride may be poled polyvinylidene fluoride.

The electrochemical cell may include a first layer comprising a piezoelectric material and at least one additional layer coupled to the first layer. The at least one additional layer may have at least one improved material property over the first layer. The material properties may be selected from the group consisting of Young's modulus, flexural modulus, impact strength, tensile strength, flexural strength, Rockwell hardness, and elongation at break. The at least one additional layer may be formed of at least one material selected from carbon, layered materials, metal carbides, non-metal carbides, metal nitrides, non-metal nitrides, metal silicides, non-metal silicides, polymers, and metal alloys.

A portion of the protective layer may be located between the anode and the electrolyte in the electrochemical cell. The protective layer may be configured as a barrier to separate the anode from the electrolyte. The protective layer may be a coating on a surface of the anode. The protective layer may be a layer directly attached to a surface of the anode. The protective layer may be a layer not directly attached to a surface of the anode but one that is placed on the anode surface during assembly of the electrochemical device. The protective layer may be a separator by itself that separates the anode and the cathode. The solid-electrolyte interface may form on the cathode side of the protective layer. The protective layer may be a coating on a surface of the cathode that activates when the anode touches the layer. The protective layer may be a layer directly attached to a surface of the cathode. The protective layer may be a layer not directly attached to a surface of the cathode but one that is placed on the cathode surface during assembly of the electrochemical device. The protective layer may have a thickness between 0.1 and 500 micrometers, between 1 and 100 micrometers, between 15 and 25 micrometers, or between 19 and 21 micrometers.

The protective layer of the electrochemical cell may be selectively permeable. The protective layer may be selectively permeable to lithium ions. The protective layer may be formed of a material having a piezoelectric coefficient ($d_{33}$ and/or $d_{31}$) of at least 0.1 pC/N, of at least 1 pC/N, of at least 3 pC/N, of at least 4 pC/N, of at least 5 pC/N, of at least 7 pC/N, of at least 10 pC/N, of at least 15 pC/N, of at least 20 pC/N, of at least 25 pC/N, of at least 50 pC/N, of at least 75 pC/N, of at least 100 pC/N, of at least 150 pC/N, of at least 200 pC/N, of at least 250 pC/N, of at least 300 pC/N, of at least 350 pC/N, of at least 400 pC/N, of at least 450 pC/N, of at least 500 pC/N, or some other value therebetween.

The protective layer of the electrochemical cell may produce a voltage when subjected to a force. The voltage may be produced on the anode side, on the cathode side, or throughout the protective layer. A protrusion from the anode may produce the force on the protective layer. The protrusion may cause a deformation of the protective layer. The protrusion may be a lithium dendrite. The protrusion may also be a dendrite formed of another common anode metal such as sodium, magnesium, or zinc. The voltage produced may be primarily confined to within about 10, 5, 4, 3, 2, 1, or 0.1 nanometers of the protrusion. The voltage produced may be confined to the region of the protrusion. The magnitude of the voltage produced may be correlated to the magnitude of the force. This correlation may be positive. For example, as the magnitude of the force is increased, the protective layer may produce a subsequently increased voltage. The voltage produced may have a magnitude of at least 0.1, 1, 3, 5, 7, 10, 20, 30, 40, 50, 60, 70, 80, 90, 100, 125, 150, 175, 200, 225, 250, 300, 400, 500, 600, 700, 800, or 900 microvolts, 1, 10, 100, or 500 millivolts, 1, 10, or 100 volts or greater.

The surface of the protective layer can be treated in a manner that changes at least one surface property, wherein the surface properties are selected from a group consisting of roughness, hydrophilicity, surface charge, surface energy, biocompatibility, permeability, and reactivity. Other surface properties may also be adjusted. The protective layer may comprise a plasma treated non-piezoelectric polymer, wherein the treatment generates surface charges. The voltage from these surface charges and the curvature-dependent distribution can shield any dendrite protrusion. The protective layer may specifically be plasma treated piezoelectric polymer such as polyvinylidene fluoride, where the combined piezoelectric and surface charge effects may work together to suppress dendrite formation.

The anode of the electrochemical cell may be a solid metal. The anode may be at least one of sodium, magnesium, zinc, or lithium. The anode may be lithium metal. Alternatively, the electrochemical cell may be a lithium-ion cell and the anode may be selected from the group consisting of graphite, activated carbon, carbon black, lithium titanate, graphene, tin-cobalt alloys, and silicone.

The cathode of the electrochemical cell may comprise a lithium host material. The lithium host material may be selected from lithium metal oxides wherein the metal is one or more of aluminum, cobalt, iron, manganese, nickel, vanadium, and lithium-containing phosphates having a general formula $LiMPO_4$ wherein M is one or more of cobalt, iron, manganese, and nickel. The lithium host material may be selected from the group consisting of lithium cobalt oxide, lithium nickel manganese cobalt oxide, and lithium manganese oxide. The cathode may comprise sulfur. The cathode may comprise an air electrode.

The electrolyte may be a liquid electrolyte. The liquid electrolyte of the electrochemical cell may comprise a lithium compound in an organic solvent. The lithium compound may be selected from $LiPF_6$, $LiBF_4$, $LiClO_4$, lithium bis(fluorosulfonyl)imide (LiFSI), $LiN(CF_3SO_2)_2$ (LiTFSI), and $LiCF_3SO_3$ (LiTf). The organic solvent may be selected from carbonate based solvents, ether based solvents, ionic liquids, and mixtures thereof. The carbonate based solvent may be selected from the group consisting of dimethyl carbonate, diethyl carbonate, ethyl methyl carbonate, dipropyl carbonate, methylpropyl carbonate, ethylpropyl carbonate, methylethyl carbonate, ethylene carbonate, propylene carbonate, and butylene carbonate; and the ether based solvent is selected from the group consisting of diethyl ether, dibutyl ether, monoglyme, diglyme, tetraglyme, 2-methyltetrahydrofuran, tetrahydrofuran, 1,3-dioxolane, 1,2-dimethoxyethane, and 1,4-dioxane. The electrochemical cell may also comprise a separator located between the anode and the cathode. The separator may be a permeable polymer.

The electrolyte may be a solid-state electrolyte. The solid electrolyte material may comprise a material selected from the group consisting of lithium lanthanum zirconium oxides (LLZO), $Li_{10}GeP_2S_{12}$ (LGPS), $Li_{0.33}La_{0.56}TiO_3$ (LLTO), $Li_2PO_2N$ (LiPON), and lithium polysulfides (LiPS).

The electrochemical cell may further comprise a battery management system including a controller in electrical communication with the protective layer. The controller is configured to execute a program stored in the controller to monitor the voltage produced by the protective layer to determine whether a dendritic structure is growing on at least one of the anode and the cathode.

The electrochemical cell may further comprise at least one current collector in contact with at least one of the anode or cathode. The current collector may comprise a suitable metallic material such as aluminum, copper, silver, iron, gold, nickel, cobalt, titanium, molybdenum, steel, zirconium, tantalum, and stainless steel. The anode and cathode may be connected to an electrical component through a circuit.

In another aspect, the present disclosure provides a method of reducing dendrite growth in an electrochemical cell. The method comprises arranging a protective layer between the anode and the cathode, generating a voltage in an area of the protective layer, and shielding metal ions from depositing in the area.

The voltage generated in the protective layer in the method may be produced by at least one of the piezoelectric effect, charge shifting, charge asymmetry, or local charge flow. The voltage may be generated by the piezoelectric effect. The piezoelectric voltage may be generated by an anode dendrite contacting the area of the protective layer. The voltage may be generated by the dendrite pushing on the area of the protective layer in an orthogonal direction. The voltage may be generated by the dendrite stretching the area of the protective layer in a lateral direction.

The electrochemical cell may be a lithium metal cell and the metal ions may be lithium ions. Shielding the metal ions may include repelling positively charged ions with the generated voltage, wherein the voltage is positive in the area of the protective layer surrounding any protrusion. Shielding the metal ions from depositing in the area may cause the deposition of lithium ions to increase in other regions of the metal anode, creating a flattened anode surface. The method may further comprise adjusting or controlling the temperature of the electrochemical cell to induce a change in the piezoelectric properties of the protective layer.

In yet another aspect, the present disclosure provides a method of detecting dendrite growth in an electrochemical cell. The method comprises (a) arranging a protective layer between an anode and a cathode of the electrochemical cell; and (b) detecting a voltage generated in an area of the protective layer by growth of a dendrite on at least one of the anode and the cathode. The voltage generated in the protective layer may be produced by at least one of the piezoelectric effect, charge shifting, charge asymmetry, or local charge flow.

In yet another aspect, the present disclosure provides a battery comprising one or more interconnected electrochemical cells as described herein, wherein the electrochemical cells are connected in a series, in parallel, or a combination thereof. The electrochemical cells described herein may be used for a variety of batteries and other electrochemical energy storage devices. For example, the electrochemical cells may be used in lithium metal anode batteries, such as lithium-sulfur batteries and lithium-air batteries, among others.

Batteries comprising one or more of the electrochemical cells described herein may exhibit a Coulombic efficiency of at least about 60%, at least about 70%, at least about 80%, at least about 85%, at least about 90%, at least about 95%, or at least about 98%, and up to about 99% or more, up to about 99.5% or more, or up to about 99.9% or more at a current density of about 0.1 mA/cm$^2$, 0.25 mA/cm$^2$, 0.5 mA/cm$^2$, 2 mA/cm$^2$, 5 mA/cm$^2$, 10 mA/cm$^2$, or another current density value. This efficiency may be an initial or a maximum Coulombic efficiency or one that is averaged over a certain number of cycles, such as 100, 200, 300, 400, 500, 1,000, 5,000, or 10,000 cycles. The Coulombic efficiency may be retained at any of the efficiencies listed above at any current density listed above for any number of cycles listed above.

The protective layer described in the present disclosure may be combined with other materials or methods to prevent dendrite growth from the metal anode (e.g., lithium, magnesium, sodium, zinc) surface. For example, the protective layer may be coupled to a physical barrier or used with specific electrolyte solutions or charge generating methods.

Figure 1:
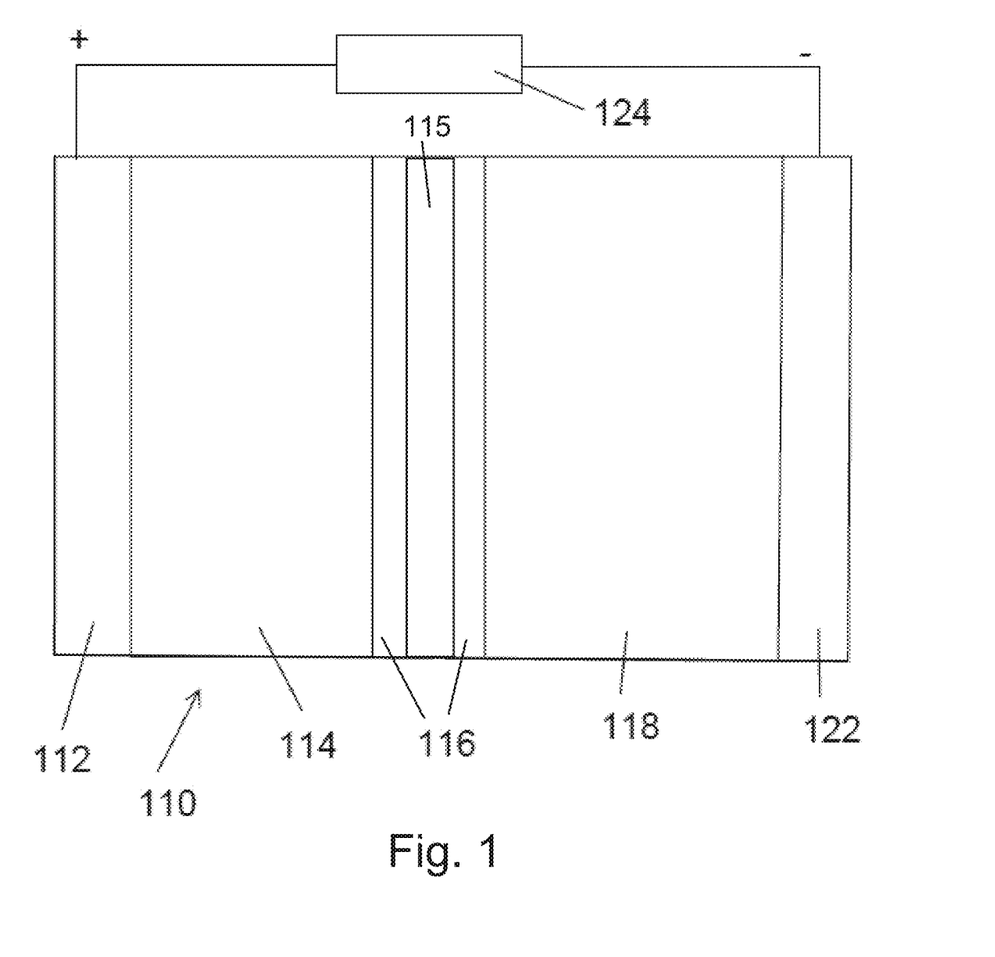
FIG. 1 is a schematic of a generic electrochemical cell.

A generic electrochemical cell is depicted in FIG. 1. The electrochemical cell 110 of FIG. 1 includes a current collector 112 in contact with a cathode 114. At least a portion of an amount of a liquid electrolyte 116 is arranged between the cathode 114 and an anode 118, which is in contact with a current collector 122. A separator 115 keeps the cathode 114 and the anode 118 from touching but allows metal ions through. The current collectors 112 and 122 of the electrochemical cell 110 may be in electrical communication with an electrical component 124. The electrical component 124 could place the electrochemical cell 110 in electrical communication with an electrical load that discharges the battery or a charger that charges the battery.

A suitable active material for the cathode 114 of the electrochemical cell 110 is one or more of the lithium host materials described above, or porous carbon (for a lithium air battery), or a sulfur containing material (for a lithium sulfur battery). The lithium host materials may be selected from lithium metal oxides wherein the metal is one or more of aluminum, cobalt, iron, manganese, nickel, vanadium, lithium-containing phosphates having a general formula LiMPO$_4$ wherein M is one or more of cobalt, iron, manganese, and nickel. In one embodiment, the lithium host material is selected from lithium cobalt oxide, lithium nickel manganese cobalt oxide, and lithium manganese oxide.

A suitable active material for the anode 118 of the electrochemical cell 110 is lithium metal. However, other batteries suitable for use in the system and methods of the present disclosure include a metal electrode comprising a metal selected from magnesium, sodium, and zinc.

An example electrolyte 116 of the electrochemical cell 110 comprises a lithium compound in an organic solvent. The lithium compound may be selected from LiPF$_6$, LiBF$_4$, LiClO$_4$, lithium bis(fluorosulfonyl)imide (LiFSI), LiN(CF$_3$SO$_2$)$_2$ (LiTFSI), and LiCF$_3$SO$_3$ (LiTf). The organic solvent may be selected from carbonate based solvents, ether based solvents, ionic liquids, and mixtures thereof. The carbonate based solvent may be selected from the group consisting of dimethyl carbonate, diethyl carbonate, ethyl methyl carbonate, dipropyl carbonate, methylpropyl carbonate, ethylpropyl carbonate, methylethyl carbonate, ethylene carbonate, propylene carbonate, and butylene carbonate; and the ether based solvent may be selected from the group consisting of diethyl ether, dibutyl ether, monoglyme, diglyme, tetraglyme, 2-methyltetrahydrofuran, tetrahydrofuran, 1,3-dioxolane, 1,2-dimethoxyethane, and 1,4-dioxane.

During normal operation, the principal functions of the separator 115 are to prevent electronic conduction (i.e., shorts or direct contact) between the anode and cathode while permitting ionic conduction via the electrolyte. A suitable material for the separator 115 of the electrochemical cell 110 is porous polypropylene, porous polyethylene, or blends or layers thereof. The separator may comprise the protective layer described in the present disclosure, so that the protective layer functions as the separator.

Alternatively, the separator 115 and the liquid electrolyte 116 of the electrochemical cell 110 may be replaced with a solid electrolyte material. In non-limiting example solid electrolyte materials, the solid electrolyte material comprises a material selected from the group consisting of lithium lanthanum zirconium oxides (LLZO), $Li_{10}GeP_2S_{12}$ (LGPS), $Li_{0.33}La_{0.56}TiO_3$ (LLTO), $Li_2PO_2N$ (LiPON), and lithium polysulfides (LiPS).

In another non-limiting example version of the invention, a protective layer is used in a magnesium metal battery. In the magnesium metal battery, the anode may include magnesium metal. The cathode may include various materials that show an electrochemical reaction at a higher electrode potential than the anode. Examples of cathode materials include transition metal oxides. In the magnesium metal battery, magnesium cations are reversibly stripped and deposited between the anode and cathode. In the magnesium metal battery, the electrolyte may be a liquid electrolyte comprising a magnesium compound in an organic solvent. The magnesium compound may be selected from $Mg(B_xH_y)_z$ wherein x=3-12, y=8-12 and z=1-2; $Mg(BX_4)_2$ wherein X is selected from H, F and O-alkyl; $Mg[B(C_2O_4)_2]_2$; $Mg[BF_2(C_2O_4)]_2$; $Mg(ClO_4)_2$; $Mg(BF_4)_2$; $Mg(PF_6)_2$; $Mg(AsF_6)_2$; $Mg(SbF_6)_2$; $MgBr_2$; $Mg(CF_3SO_3)_2$; $Mg(CF_3SO_2)_2$; $Mg(C(CF_3SO_2)_3)_2$; $Mg(B(C_6F_5)_4)_2$; $Mg(B(C_6H_5)_4)_2$; $Mg(N(SO_2CF_3)_2)_2$; $Mg(N(SO_2CF_2CF_3)_2)_2$; $Mg(N(SO_2C_2F_5)_2)_2$; $Mg(BF_3C_2F_5)_2$; and $Mg(PF_3(CF_2CF_3)_3)_2$. The organic solvent may be an ether based solvent selected from the group consisting of diethyl ether, dibutyl ether, monoglyme, diglyme, tetraglyme, 2 methyltetrahydrofuran, tetrahydrofuran, 1,3-dioxolane, 1,2-dimethoxyethane, and 1,4-dioxane.

Figure 2:
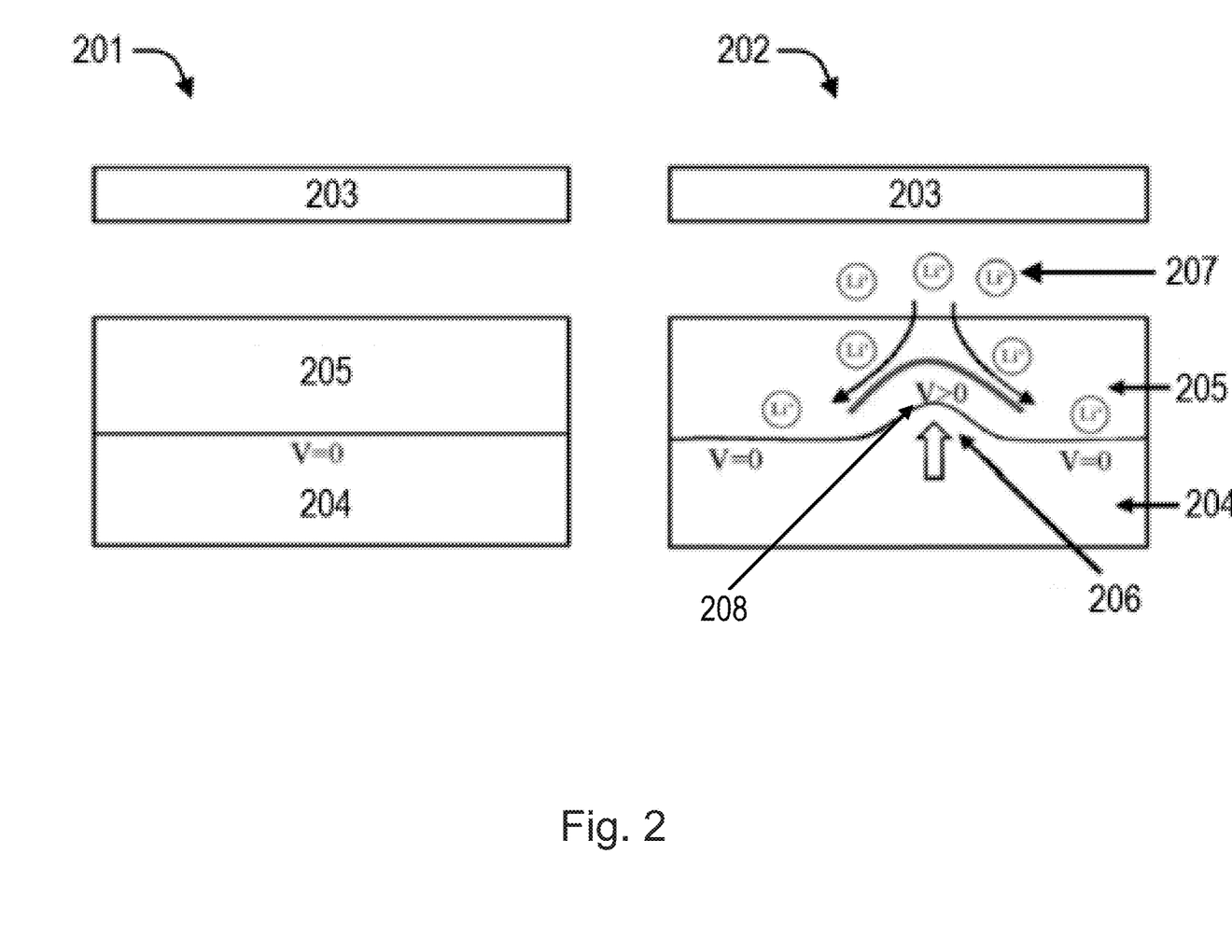
FIG. 2 is a schematic representation of an electrochemical cell at an initial state (left) and after a period of time has passed (right), in accordance with one embodiment of the present disclosure. Certain components such as the electrolyte have been omitted for clarity.

FIG. 2 illustrates an electrochemical cell at an initial state 201 and after a period of time has passed 202. In this illustration, certain components such as the electrolyte have been omitted for clarity. Both electrochemical cells include a cathode 203, an anode 204, and a protective layer 205. The electrochemical cell after a period of time has passed 202, includes a dendrite 206 extending from the anode 204. In this particular illustration, the dendrite pushes in an orthogonal direction to the protective layer 205. As a result of the piezoelectric effect, a voltage is produced by the protective layer 205 in a local area 208 near the dendrite growth. This voltage acts to shield lithium ions 207 from depositing onto and/or interpolating into the anode. In an alternative embodiment not depicted in FIG. 2, the protective layer 205 can be thin enough that the dendrite 206 deforms through the thickness, thereby creating voltage shielding on the side of the protective layer not in contact with the anode 204. Although lithium ions are depicted here, one of skill in the art could envision the shielding of any number of ions commonly present in various electrochemical cells.

Figure 3:
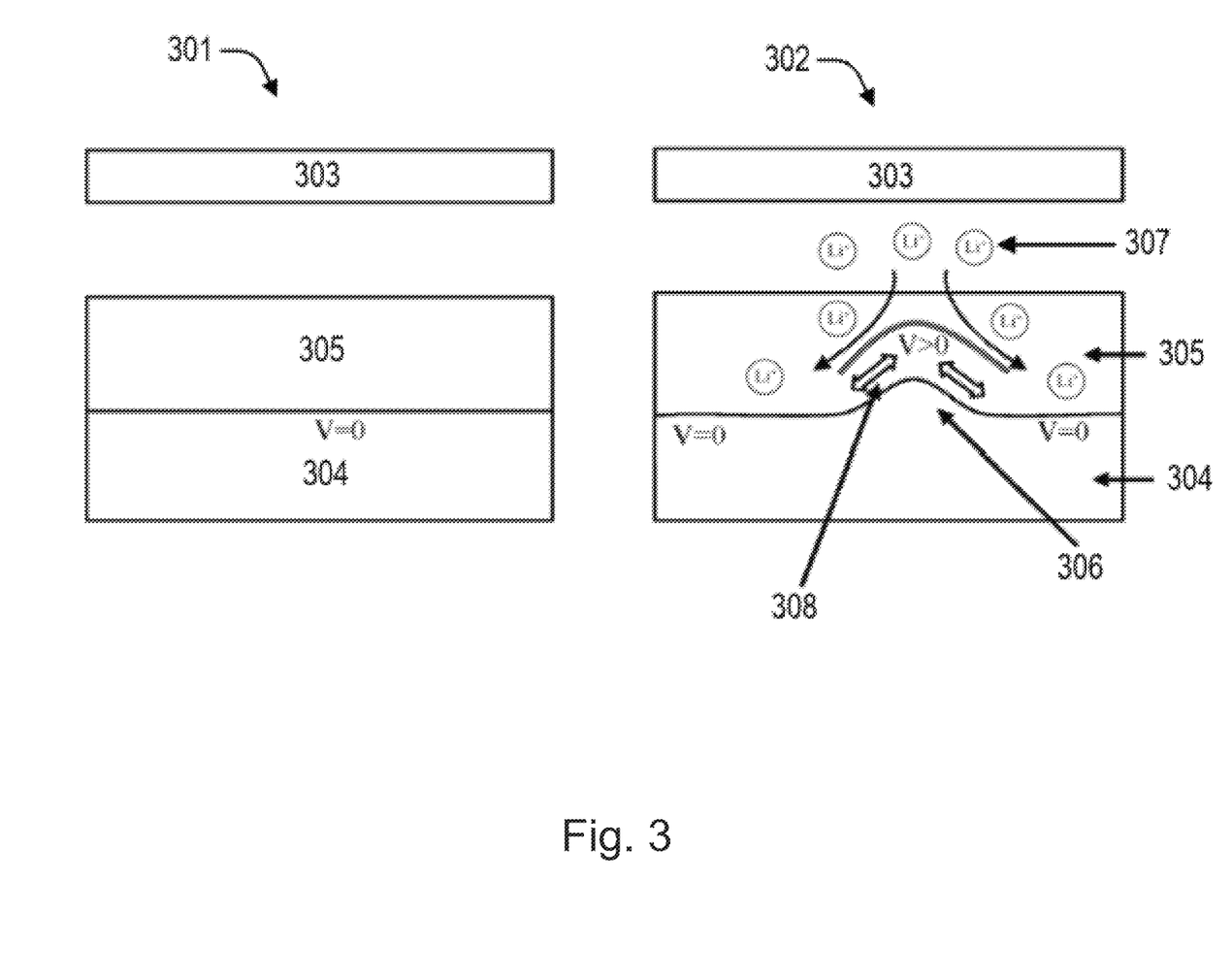
FIG. 3 is a schematic representation of an electrochemical cell at an initial state (left) and after a period of time has passed (right), in accordance with another embodiment of the present disclosure. Certain components such as the electrolyte have been omitted for clarity.

FIG. 3 illustrates an electrochemical cell at an initial state 301 and after a period of time has passed 302. In this illustration, certain components such as the electrolyte have been omitted for clarity. Both electrochemical cells include a cathode 303, an anode 304, and a protective layer 305. The electrochemical cell after a period of time has passed 302, includes a dendrite 306 extending from the anode. In this particular illustration, the dendrite stretches the protective layer 305 in a lateral direction. As a result of the piezoelectric effect, a voltage is produced by the protective layer 305 in a local area 308 near the dendrite growth. This voltage acts to shield lithium ions 307 from depositing onto and/or interpolating into the anode. In an alternative embodiment not depicted in FIG. 3, the protective layer 305 can be thin enough that the dendrite 306 deforms through the thickness, thereby creating voltage shielding on the side of the protective layer not in contact with the anode 304. Although lithium ions are depicted here, one of skill in the art could envision the shielding of any number of ions commonly present in various electrochemical cells.

Figure 4:
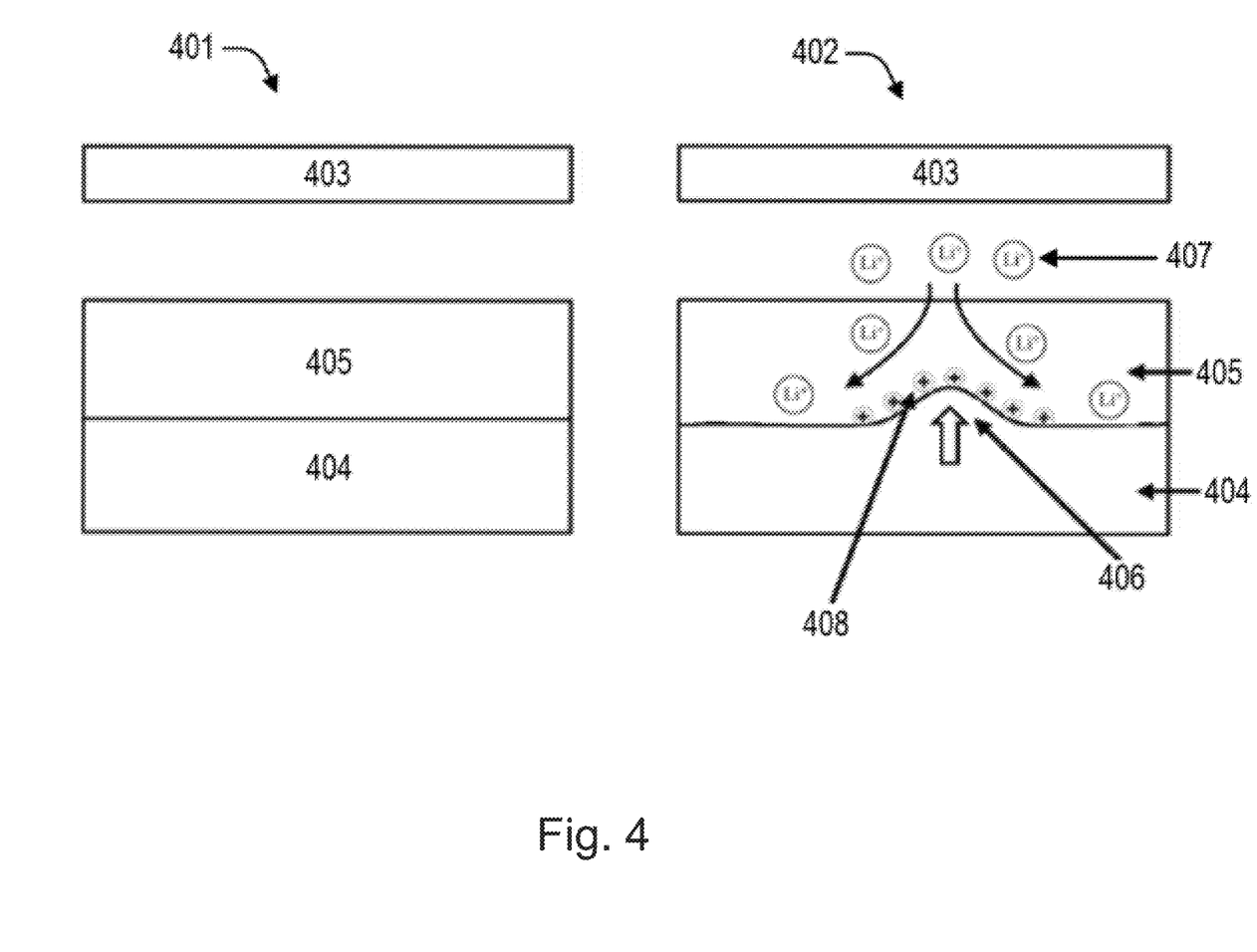
FIG. 4 is a schematic representation of an electrochemical cell at an initial state (left) and after a period of time has passed (right), in accordance with another embodiment of the present disclosure. Certain components such as the electrolyte have been omitted for clarity.

FIG. 4 illustrates an electrochemical cell at an initial state 401 and after a period of time has passed 402. In this illustration, certain components such as the electrolyte have been omitted for clarity. Both electrochemical cells include a cathode 403, an anode 404, and a protective layer 405. The electrochemical cell after a period of time has passed 402, includes a dendrite 406 extending from the anode. In this particular illustration, the dendrite pushes in an orthogonal direction to the protective layer 405. As a result of the piezoelectric effect, a voltage is produced by the protective layer 405 in a local area 408 near the dendrite growth. In this illustration, the voltage is depicted as charge circles on the interface of the anode and protective layer. This voltage acts to shield lithium ions 407 from depositing onto and/or interpolating into the anode. In an alternative embodiment not depicted in FIG. 4, the protective layer 405 can be thin enough that the dendrite 406 deforms through the thickness, thereby creating voltage shielding on the side of the protective layer not in contact with the anode 404. Although lithium ions are depicted here, one of skill in the art could envision the shielding of any number of ions commonly present in various electrochemical cells.

Figure 5:
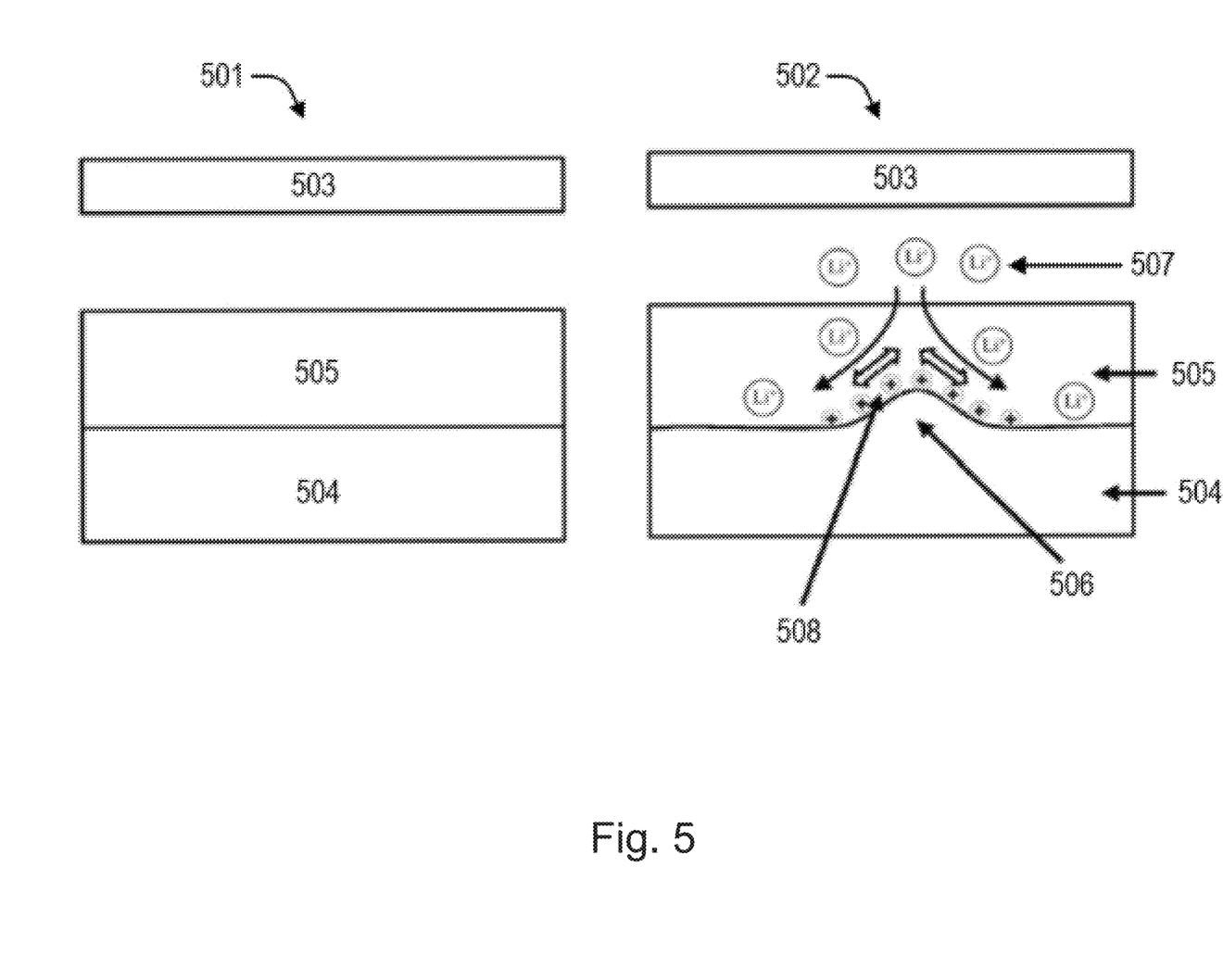
FIG. 5 is a schematic representation of an electrochemical cell at an initial state (left) and after a period of time has passed (right), in accordance with another embodiment of the present disclosure. Certain components such as the electrolyte have been omitted for clarity.

FIG. 5 illustrates an electrochemical cell at an initial state 501 and after a period of time has passed 502. In this illustration, certain components such as the electrolyte have been omitted for clarity. Both electrochemical cells include a cathode 503, an anode 504, and a protective layer 505. The electrochemical cell after a period of time has passed 502, includes a dendrite 506 extending from the anode. In this particular illustration, the dendrite stretches the protective layer 505 in a lateral direction. As a result of the piezoelectric effect, a voltage is produced by the protective layer 505 in a local area 508 near the dendrite growth. In this illustration, the voltage is depicted as charge circles on the interface of the anode and protective layer. This voltage acts to shield lithium ions 507 from depositing onto and/or interpolating into the anode. In an alternative embodiment not depicted in FIG. 5, the protective layer 505 can be thin enough that the dendrite 506 deforms through the thickness, thereby creating voltage shielding on the side of the protective layer not in contact with the anode 504. Although lithium ions are depicted here, one of skill in the art could envision the shielding of any number of ions commonly present in various electrochemical cells.

Figure 6:
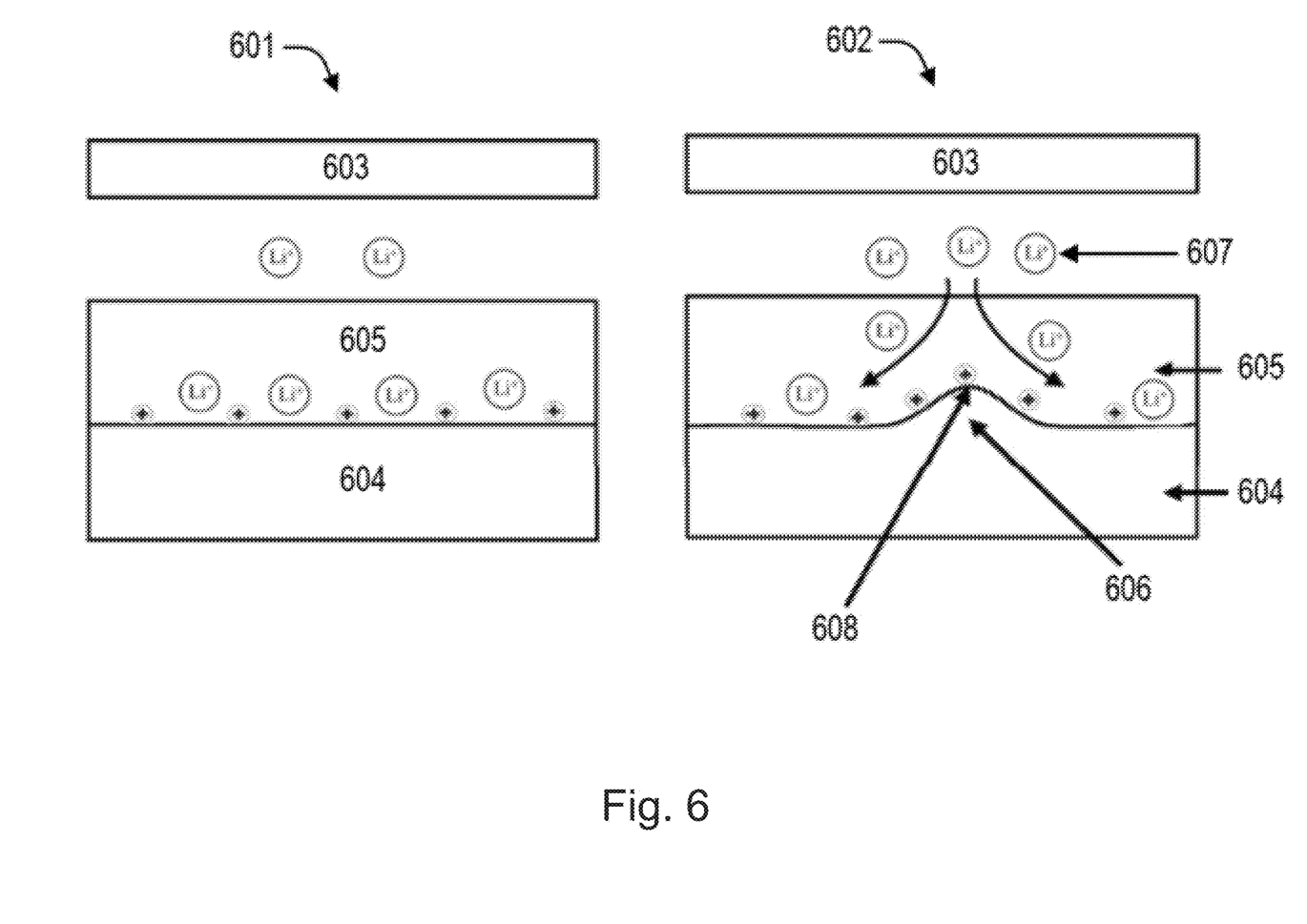
FIG. 6 is a schematic representation of an electrochemical cell at an initial state (left) and after a period of time has passed (right), in accordance with another embodiment of the present disclosure. Certain components such as the electrolyte have been omitted for clarity.

FIG. 6 illustrates an electrochemical cell at an initial state 601 and after a period of time has passed 602. In this illustration, certain components such as the electrolyte have been omitted for clarity. Both electrochemical cells include a cathode 603, an anode 604, and a protective layer 605. In this particular embodiment the protective layer 605 has been plasma treated. The electrochemical 602, includes a dendrite 606 extending from the anode. In this particular illustration, the dendrite pushes in an orthogonal direction to the protective layer 605. As a result of the piezoelectric effect, a voltage is increased by the protective layer 605 in a local area 608 near the dendrite growth. In this illustration, the voltage is depicted as charge circles on interface of the anode and protective layer. This voltage acts to shield lithium ions 607 from depositing onto and/or interpolating into the anode. In an alternative embodiment not depicted in FIG. 6, the protective layer 605 can be thin enough that the dendrite 606 deforms through the thickness, thereby creating voltage shielding on the side of the protective layer not in contact with the anode 604. Although lithium ions are depicted here, one of skill in the art could envision the shielding of any number of ions commonly present in various electrochemical cells.

Figure 7:
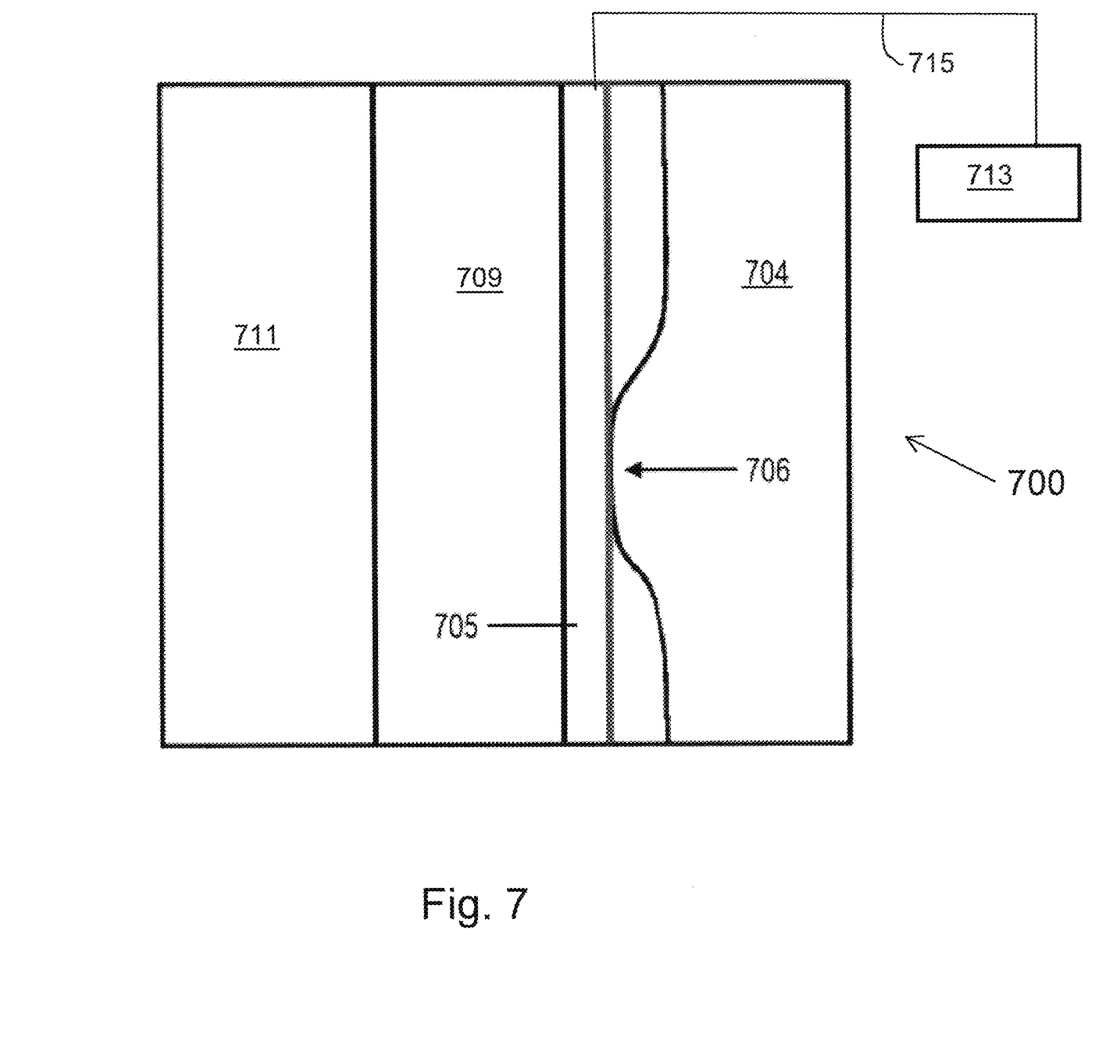
FIG. 7 is a schematic representation of part of an electrochemical cell with a protective layer, in accordance with another embodiment of the present disclosure.

FIG. 7 illustrates an electrochemical device 700 including an anode 704, a protective layer 705, a dendrite 706 contacting the protective layer 705, an electrolyte 709, and a cathode 711. The anode 704 may comprise any of the anode materials described above; the protective layer 705 may comprise any of the protective layer materials described above; the electrolyte 709 may comprise any of the electrolyte materials described above; and the cathode 711 may comprise any of the cathode materials described above.

The electrochemical device 700 includes a battery management system 713 in electrical communication with the protective layer 705 via an electrical lead 715. Alternatively, the battery management system 713 may be in electrical communication with the protective layer 705 via wireless communication. The battery management system 713 may also be in electrical communication with the protective layer 705 via detecting the signal embedded in the cell external voltage. Battery management systems are used in a wide variety of electrically powered devices. For example, a battery management system for an electric vehicle may include an electronic controller to monitor various parameters associated with the operation of one or more electrochemical cells of a battery. For example, temperature, pressure, current, voltage, capacity, and so forth can be monitored by the controller of the battery management system. The battery management system acts as the control center that interfaces with on-board automotive systems to ensure safety. The battery management system monitors the battery parameters, protects the cells from damage, and works to improve battery life.

In one example embodiment, the battery management system 713 of the electrochemical device 700 monitors piezoelectric signals from the protective layer 705. As detailed above, when the dendrite 706 pushes in an orthogonal direction to the protective layer 705, a voltage may be produced by the protective layer 705 in a local area near the dendrite growth as a result of the piezoelectric effect. Also, when the dendrite 706 stretches the protective layer 705 in a lateral direction, a voltage may be produced by the protective layer 305 in a local area near the dendrite growth as a result of the piezoelectric effect. Thus, protrusion from the dendrite 706 against the protective layer 705 will generate piezoelectric signals that are monitored by the battery management system 713.

The battery management system 713 enables an electrochemical device 700 with self-diagnosis capability, where any dendrite protrusion will generate piezoelectric signals in the cell external voltage. Monitoring of these piezoelectric signals by the battery management system 713 provides direct information on how significant the dendrite 706 is. With this early warning of unsafe cells provided by the generation of piezoelectric signals from the formation of a dendritic structure, appropriate actions (e.g., replace the unsafe cells) can be undertaken before the dendrite 706 penetrates a separating layer (e.g., a solid state electrolyte or a separator) and causes a short circuit. This can dramatically improve the battery safety (e.g., the risk of battery fires is minimized).

EXAMPLE

The following Example is provided in order to demonstrate and further illustrate certain embodiments and aspects of the present invention and is not to be construed as limiting the scope of the invention.

Example 1

Figure 8:
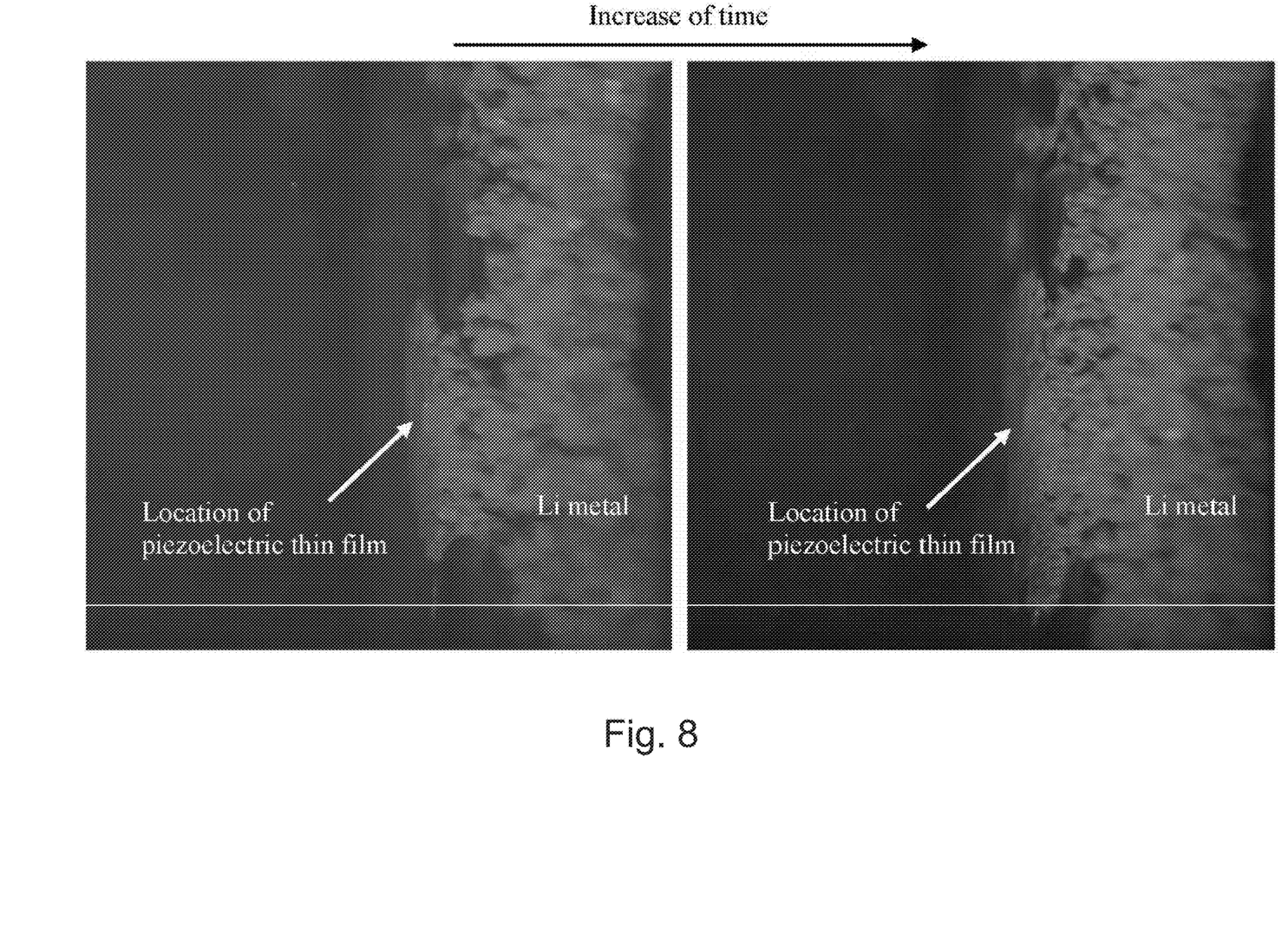
FIG. 8 is a collection of two experimental images which show the dendrite growth of the lithium metal over time when a piezoelectric thin film is used as the protective layer.

A protective layer of poled polyvinylidene fluoride (PVDF) was placed between an electrolyte and lithium metal anode as shown in the images of FIG. 8. The film thickness of the PVDF was roughly 20 micrometers. When comparing the earlier image (left) and the later image (right), the observed growth of the lithium dendrite over time was in the lateral direction along the surface of the PVDF film. The dendrite did not penetrate the surface of the PVDF film. Therefore, in this specific experiment, it was demonstrated that a piezoelectric film, namely PVDF, was able to reduce dendrite growth in the orthogonal direction.

Thus, the present invention provides a system and methods for preventing dendrite growth by use of a protective layer in an electrochemical cell. Use of a material or design film with strong piezoelectric effect may completely prevent dendrite formation. The present invention also provides electrochemical cells with self-diagnosis capability, where any dendrite protrusion will generate piezoelectric signals that can be monitored to provide information on how significant dendrite formation is. Use of a material or design film with a smaller piezoelectric effect, which may not completely prevent dendrite formation, can serve as a self-diagnosis tool to indicate how significant the dendrite is to improve battery safety.

Although the invention has been described in considerable detail with reference to certain embodiments, one skilled in the art will appreciate that the present invention can be used in alternative embodiments to those described, which have been presented for purposes of illustration and not of limitation. Therefore, the scope of the appended claims should not be limited to the description of the embodiments contained herein.

What is claimed is:
1. An electrochemical cell comprising:
   an anode;
   a cathode;
   an electrolyte, wherein at least a portion of the electrolyte is located between the anode and cathode; and a protective layer, wherein the protective layer is capable of producing a voltage and at least a portion of the protective layer is located between the anode and cathode, wherein the voltage is produced by a piezoelectric effect, wherein the protective layer produces a voltage when subjected to a force, wherein a protrusion from the anode produces the force on the protective layer, wherein the voltage produced shields lithium ions from depositing in a region of the protrusion, and wherein the protective layer comprises a piezoelectric material selected from a group consisting of quartz, aluminum phosphate, aluminum nitride, sucrose, potassium sodium tartrate, topaz, lead titanate, tourmaline, langasite, gallium orthophosphate, lithium niobate, lithium tantalate, barium titanate, lead zirconate titanate, potassium niobate, lead indium niobate, lead magnesium niobate, sodium tungstate, zinc oxide, sodium potassium niobate, bismuth ferrite, sodium niobate, barium titanate, sodium bismuth titanate, poled polyvinylidene fluoride, polyam ides, liquid-crystalline polymers, polyureas, polyacrylonitrile, polyvinylidene chloride, polyvinyl acetate, polyphenylethernitrile, nylons, poly(vinylidene cyanide-vinylacetate), poly (1-bicyclobutanecarbonitrile), poly(vinylidene fluoride-trifluoroethylene), poly(vinylidene fluoride-tetrafluoroethylene), copolymers of these materials, or composites of these materials.

2. The electrochemical cell of claim 1, wherein the protective layer is a piezoelectric material that has undergone at least one of mechanical stretching, electric poling, or electrospinning.

3. The electrochemical cell of claim 1, wherein the protective layer comprises:
   a first layer comprising a piezoelectric material; and
   at least one additional layer coupled to the first layer.

4. The electrochemical cell of claim 3, wherein the at least one additional layer is formed of at least one material selected from carbon, layered materials, metal carbides, non-metal carbides, metal nitrides, non-metal nitrides, metal silicides, non-metal silicides, and metal alloys.

5. The electrochemical cell of claim 1, wherein at least a portion of the protective layer is located between the anode and the electrolyte.

6. The electrochemical cell of claim 5, wherein the protective layer is configured as a barrier to separate the anode from the electrolyte.

7. The electrochemical cell of claim 5, wherein the protective layer is a coating on a surface of the anode.

8. The electrochemical cell of claim 1, wherein the protective layer is located on the surface of the cathode.

9. The electrochemical cell of claim 8, wherein a solid-electrolyte interface forms on the cathode side of the protective layer.

10. The electrochemical cell of claim 1, wherein the protective layer has a thickness between 0.1 and 500 micrometers.

11. The electrochemical cell of claim 1, wherein the protective layer is selectively permeable to lithium ions.

12. The electrochemical cell of claim 1, wherein the protective layer is formed of a material having a piezoelectric coefficient of at least 4 pC/N.

13. The electrochemical cell of claim 1, wherein the protrusion is a lithium dendrite.

14. The electrochemical cell of claim 1, wherein the voltage produced is confined to the region of the protrusion.

15. The electrochemical cell of claim 1, wherein the magnitude of the voltage produced is correlated to the magnitude of the force.

16. The electrochemical cell of claim 1, wherein the voltage is a magnitude of 100 microvolts or greater.

17. The electrochemical cell of claim 1, wherein the surface of the protective layer is treated in a manner that changes at least one surface property, wherein the surface properties are selected from a group consisting of roughness, hydrophilicity, surface charge, surface energy, biocompatibility, permeability, and reactivity.

18. The electrochemical cell of claim 1, wherein the protective layer is plasma treated.

19. The electrochemical cell of claim 1, wherein the protective layer is plasma treated polyvinylidene fluoride.

20. The electrochemical cell of claim 1, wherein the anode is lithium metal.

21. The electrochemical cell of claim 1, wherein the electrochemical cell is a lithium-ion cell and the anode is selected from the group consisting of graphite, activated carbon, carbon black, lithium titanate, graphene, tin-cobalt alloys, and silicone.

22. The electrochemical cell of claim 1, wherein the cathode comprises a lithium host material.

23. The electrochemical cell of claim 1, wherein the electrochemical cell also comprises a separator located between the anode and the cathode.

24. The electrochemical cell of claim 23, wherein the separator is a permeable polymer.

25. The electrochemical cell of claim 1, wherein the electrolyte is a solid-state electrolyte comprising a material selected from the group consisting of lithium lanthanum zirconium oxides (LLZO), $Li_{10}GeP_2S_{12}$ (LGPS), $Li_{0.33}La_{0.56}TiO_3$ (LLTO), $Li_2PO_2N$ (LiPON), and lithium polysulfides (LiPS).

26. The electrochemical cell of claim 1, further comprising:
   a battery management system including a controller in electrical communication with the protective layer,
   wherein the controller is configured to execute a program stored in the controller to monitor the voltage produced by the protective layer to determine whether a dendritic structure is growing on at least one of the anode and the cathode.

27. The electrochemical cell of claim 14, wherein the voltage produced is a positive voltage.

28. The electrochemical cell of claim 27, wherein the protective layer comprises poled polyvinylidene fluoride.

29. The electrochemical cell of claim 1, wherein the force is produced internally in the cell.

* * * * *

UNITED STATES PATENT AND TRADEMARK OFFICE
CERTIFICATE OF CORRECTION

| | |
|---|---|
| PATENT NO. | : 11,728,521 B2 |
| APPLICATION NO. | : 16/199441 |
| DATED | : August 15, 2023 |
| INVENTOR(S) | : Wei Lu |

It is certified that error appears in the above-identified patent and that said Letters Patent is hereby corrected as shown below:

In the Specification

Column 5, Line 15, "polyma ides" should be --polyamides--.

Column 8, Line 65, "LiClO$_4$" should be --LiClO$_4$--.

Column 13, Line 22, "polyma ides" should be --polyamides--.

Signed and Sealed this
Tenth Day of October, 2023

Katherine Kelly Vidal
*Director of the United States Patent and Trademark Office*